(12) United States Patent
Brower et al.

(10) Patent No.: US 10,773,634 B2
(45) Date of Patent: Sep. 15, 2020

(54) NESTED SERIAL NETWORK CONFIGURATION FOR ARRAY OF SERIALLY CONNECTED LIGHT HEADS

(71) Applicant: Code 3, Inc., St. Louis, MO (US)

(72) Inventors: Richard Nelson Brower, St. Louis, MO (US); Daniel Scott Pursley, St. Peters, MO (US); Christopher Reineke Barber, St. Louis, MO (US); Kevin Thomas Mitchell, St. Peters, MO (US)

(73) Assignee: Code 3, Inc., St. Louis, MO (US)

( * ) Notice: Subject to any disclaimer, the term of this patent is extended or adjusted under 35 U.S.C. 154(b) by 365 days.

(21) Appl. No.: 15/751,819

(22) PCT Filed: Jun. 14, 2017

(86) PCT No.: PCT/US2017/037506
§ 371 (c)(1),
(2) Date: Feb. 9, 2018

(87) PCT Pub. No.: WO2018/231225
PCT Pub. Date: Dec. 20, 2018

(65) Prior Publication Data
US 2020/0215962 A1    Jul. 9, 2020

(51) Int. Cl.
*B60Q 1/00* (2006.01)
*B60Q 1/26* (2006.01)
(Continued)

(52) U.S. Cl.
CPC ......... *B60Q 1/0094* (2013.01); *B60Q 1/2607* (2013.01); *B60Q 1/2611* (2013.01);
(Continued)

(58) Field of Classification Search
CPC ...... B60Q 1/0088; B60Q 1/0094; B60Q 1/26; B60Q 1/2607; B60Q 1/2611; B60Q 1/50;
(Continued)

(56) References Cited

U.S. PATENT DOCUMENTS 5,524,213 A    6/1996  Dais et al.
5,884,997 A *  3/1999  Stanuch ............... B60Q 1/2611
                                                    340/472

(Continued)

OTHER PUBLICATIONS

Marco Di Natale, "Understanding and using the Controller Area Network," Handout Canbus2, http://inst.cs.berkeley.edu/~ee249/fa08/Lectures/handout_canbus2.pdf, 47 pages, Oct. 30, 2008.

*Primary Examiner* — Jason Crawford
(74) *Attorney, Agent, or Firm* — Stoel Rives LLP; Robert R. Teel

(57) ABSTRACT

An array (166, 184, 194, 230, 256) of multiple light heads (170, 186, 194, 236) for a vehicle (100) has a primary Controller Area Network (CAN) serial data bus (108, 224) to carry first serial communications among spaced-apart CAN nodes (112, 118, 130, 136, 140, 154, 220, 260, 288) communicatively coupled thereto. The first serial communications initiate a flash sequence from the array via second serial communications provided to the multiple light heads communicatively coupled to a nested CAN serial data bus (180, 190, 200, 238). An array controller (130, 136, 140, 220, 260) segregates the nested CAN serial data bus from the primary CAN serial data bus while providing a communications bridge between nodes of the two buses. Accordingly, light heads on the nested bus provide self-identification and diagnostic information to other nodes such as a computer (288) configuration utility (290) featuring a graphical user interface (292).

12 Claims, 5 Drawing Sheets

(51) Int. Cl.
*H04L 12/46* (2006.01)
*H04L 12/40* (2006.01)

(52) U.S. Cl.
CPC .... *H04L 12/40169* (2013.01); *H04L 12/4625* (2013.01); *H04L 2012/40215* (2013.01); *H04L 2012/40273* (2013.01)

(58) Field of Classification Search
CPC ............ B60Q 1/52; H04L 2012/40215; H04L 2012/40267; H04L 2012/40273
See application file for complete search history.

(56) References Cited

U.S. PATENT DOCUMENTS

| | | | |
|---|---|---|---|
| 7,476,013 B2* | 1/2009 | Gergets | B60Q 1/2611 362/493 |
| 8,210,725 B2* | 7/2012 | Datz | B60Q 1/2611 362/476 |
| 9,346,397 B2* | 5/2016 | Gergets | B60Q 1/2611 |
| 9,616,810 B1* | 4/2017 | Tucker | B60Q 1/38 |
| 2005/0047167 A1* | 3/2005 | Pederson | F21S 43/14 362/542 |
| 2009/0021955 A1* | 1/2009 | Kuang | H05B 45/10 362/479 |
| 2013/0282946 A1 | 10/2013 | Ricci | |
| 2014/0159890 A1 | 6/2014 | Piersing et al. | |
| 2015/0219706 A1 | 8/2015 | Loftus et al. | |
| 2015/0266411 A1* | 9/2015 | Bennie | G07C 5/008 701/36 |
| 2016/0159278 A1* | 6/2016 | Baker | G09B 9/00 340/471 |
| 2017/0085319 A1* | 3/2017 | Latham | H04B 10/116 |
| 2017/0203684 A1* | 7/2017 | Georgitsis | H05B 45/10 |
| 2017/0368982 A1* | 12/2017 | Dellock | F21S 41/143 |

* cited by examiner

NESTED SERIAL NETWORK CONFIGURATION FOR ARRAY OF SERIALLY CONNECTED LIGHT HEADS

RELATED APPLICATION

This application is a National Stage of International Application No. PCT/US2017/037506, filed Jun. 14, 2017, which is hereby incorporated by reference.

TECHNICAL FIELD

This disclosure relates to an improved serial bus architecture for a vehicle-mountable array (e.g., a light bar) of serially connected light modules, also called light engines and—according to the Society of Automotive Engineers (SAE)—light heads such as those of the class-one type of directional flashing optical warning devices for authorized emergency, maintenance, and service vehicles. In particular, this disclosure relates to a light bar having intrinsic- and extrinsic-facing serial data bus interfaces by which to convey messages controlling an internal group of serially connected light heads integral to the array.

BACKGROUND INFORMATION

FIGS. 1 and 2 show examples of previous attempts at light bar wiring technologies 10 that include bulky, multi-conductor wiring harnesses 12 for carrying illumination-control signals from a set of discrete inputs 16 to each corresponding light head 20 in a light bar 26 (FIG. 2). Each light head 20 has at least one separate wire connection 30 that is assembled based on a predetermined wire-color combination. Additional wires 34 (FIG. 2) to each light head 20 may provide different illumination-control signals, some of which are applicable to only a subset of light heads or a subset of lighting components available within a light head. For example, multicolor-emitting modules typically expect several dedicated wires for each light-emitting diode (LED) color present in a light head. Thus, the wiring scheme becomes inherently complicated, as shown in FIG. 2. The numerous wires and light heads in light bar 26 tend to increase the likelihood of various installation errors. Mismatched wire colors and location-installation errors, e.g., due to assembly errors, compromise product functionality. The complex wiring scheme results in increased assembly and test time, both of which increase production and support costs attributable to previous light bar wiring technologies 10. Given the sheer number of LED module types and combinations, electronic quality control is fraught with practical challenges.

Rudimentary attempts to mitigate the aforementioned deficiencies have included serial bus technologies 40 of FIGS. 3 and 4, which are limited to an external-facing serial bus interface 42 provided as a substitute for discrete inputs 16 (described previously). A serial bus 44 facilitates communication of serial data received at a light bar 46 (FIG. 4). The data are then converted by an integrated circuit (IC) 50 (e.g., a microcontroller) into signals carried by discrete wires 30 to light heads 20, as described previously. Serial bus technologies 40, therefore, rely on circuitry 50 to interpret serial messages and convert them into illumination-control signals carried through discrete wires 30 housed inside light bar 46. For light bar manufacturers intending to implement serial connectivity in their light bar products, these previous attempts fall short of providing individual serial connections to each light head within a light bar.

FIG. 5 shows one example of an implementation of serial bus 44 in the form of a linear Controller Area Network (CAN) serial data bus 54. The CAN serial data bus (CAN bus, or simply CAN) standard describes a message-based protocol that was originally designed for multiplexing electrical wiring within automobiles, but it has uses in many other contexts. For example, CAN is commonly employed in the automotive industry to facilitate communications that need not include a host for controlling communications between various microcontrollers and so-called Electronic Control Units (ECUs, more generally known as CAN nodes 62, or simply nodes). In other words, CAN is a multi-master serial bus standard for connecting two or more nodes forming a serial communications network.

Robert Bosch GmbH published several versions of the CAN specification, the latest of which is CAN 2.0 published in 1991. This specification has two parts: part A describes a so-called standard format for a CAN message having an 11-bit identifier field, and part B describes the so-called extended format having a 29-bit identifier. A CAN device employing standard format 11-bit identifiers is commonly called a CAN 2.0A (compliant) device, whereas a CAN device employing extended format 29-bit identifiers is commonly called a CAN 2.0B device. Furthermore, in 1993 the International Organization for Standardization (ISO) released the CAN standard ISO 11898 that developed into the following three parts: ISO 11898-1, which specifies the data link layer; ISO 11898-2, which specifies the CAN physical layer for high-speed CAN implementations; and ISO 11898-3, which specifies the CAN physical layer for low-speed, fault-tolerant CAN implementations. FIG. 5 shows an example implementation of the high-speed specification that describes linear CAN bus 54 including three CAN nodes 62 connected to one another through two wires 82 terminated at each end with 120 ohm ($\Omega$) resistors 84. Wires 82 are 120 nominal twisted pair, according to one embodiment.

SUMMARY OF THE DISCLOSURE

This disclosure describes techniques by which a serial light bar (or other types of arrays described later) acts as a single CAN node controlled by and through an interface with a primary CAN serial data bus, and has multiple, serially controlled light heads (i.e., internal nodes) communicatively coupled together through a secondary (nested) CAN serial data bus. These techniques allow full, serial control of each light head, thereby reducing discrete wiring complications, increasing the number of nodes available in the network, and facilitating light-head specific (i.e., high resolution) dialogistic capabilities since each light head has a serial connection and supports self-identification and diagnostic messaging techniques, which are described in later passages of this disclosure. By segregating primary and secondary CAN buses, the risk of a high node count and bus impedance mismatches is reduced. Signal integrity is maintained even as baud rates may increase.

Disclosed is an array of multiple light heads for a vehicle having a primary Controller Area Network (CAN) serial data bus to carry first serial communications among spaced-apart CAN nodes communicatively coupled thereto, the first serial communications for initiating a light flash sequence from the array. The array includes a secondary CAN serial data bus for establishing a nested CAN serial data bus carrying, in response to the first serial communications, second serial communications provided to the multiple light heads communicatively coupled thereto, the second serial communications for controlling the light flash sequence from the array; each of the multiple light heads including light head CAN node circuitry, the light head CAN node circuitry including a light head CAN controller electrically coupled to the secondary CAN serial data bus such that an impedance of the light head CAN node circuitry is electrically isolated from the primary CAN serial data bus when an associated light head is operatively deployed in the vehicle; and an array controller including first and second CAN node circuitry configured to communicatively segregate and bridge the primary and secondary CAN serial data buses, the first CAN node circuitry including a first CAN controller electrically couplable to the primary CAN serial data bus so as to establish a first CAN node for facilitating the first serial communications, and the second CAN node circuitry including a second CAN controller electrically coupled to the secondary CAN serial data bus so as to establish a second CAN node for facilitating the second serial communications.

Also disclosed is a method of verifying placement locations and capabilities of multiple serially connected light heads arranged to form an array that is mountable to a vehicle. The method includes transmitting a first CAN message providing an instruction to cause a serially connected light head to respond with a second CAN message including self-identification information automatically determined by the serially connected light head, the self-identification information including a light-color capability of the serially connected light head; receiving the self-identification information automatically determined by the serially connected light head; and comparing the self-identification information to a predefined set of self-identification information to determine whether the serially connected light head possesses capabilities selected for the array.

In addition, disclosed is a method, performed by a serially connected light head, of automatically determining a light-emitting diode (LED) color configuration of the serially connected light head. The method includes actuating a group of control lines that control power applied to corresponding strings of LEDs; measuring voltages applied to analog-to-digital converter (ADC) channels associated with the corresponding strings of LEDs to establish a measured voltage for each of the ADC channels, the measured voltage having a value indicating a color and presence of an illuminated string of LEDs; and communicating through a Controller Area Network (CAN) serial data bus a CAN message including information representing the color and presence of the illuminated string of LEDs.

As an added benefit of serially connected light heads, diagnostic data such as self-identification, temperature, and LED string failure information are available in real time serial messages provided from individual light modules. Accordingly, embodiments described in this disclosure capitalize on a nested architecture and thereby streamline an assembly verification process via electronic methods.

Additional aspects and advantages will be apparent from the following detailed description of embodiments, which proceeds with reference to the accompanying drawings.

DETAILED DESCRIPTION OF EMBODIMENTS

CAN affords support for a limited number of nodes due to several physical constraints. One constraint, for example, is based on the loop time during an arbitration procedure in which a signal (sent by a transmitter node) is transmitted across the bus to a farthest receiver node and back again to the transmitter node. This propagation delay is dependent on the number of nodes and their delay-causing capacitances, the type of cabling employed in the bus, and other physical aspects. Though it is possible to increase the number of nodes by decreasing a data rate of the bus, or by employing transceivers having small input capacitance, these workaround attempts are not feasible in some environments having numerous nodes, such as the environment shown and described with reference to FIG. 6. Moreover, previous light bar manufacturers have relied on an assembler to place specific LED light modules in specific locations per customer request. But there was no inherent, automatic, or electronic method to verify that an installed module is the one that has the desired specifications, e.g., it produces the correct color and has the correct number of LEDs, to ensure the desired operation of a light bar. This disclosure, therefore, also describes techniques by which an external device communicates with the serial light bar to request diagnostic information from each individual LED light module.

Figure 6:
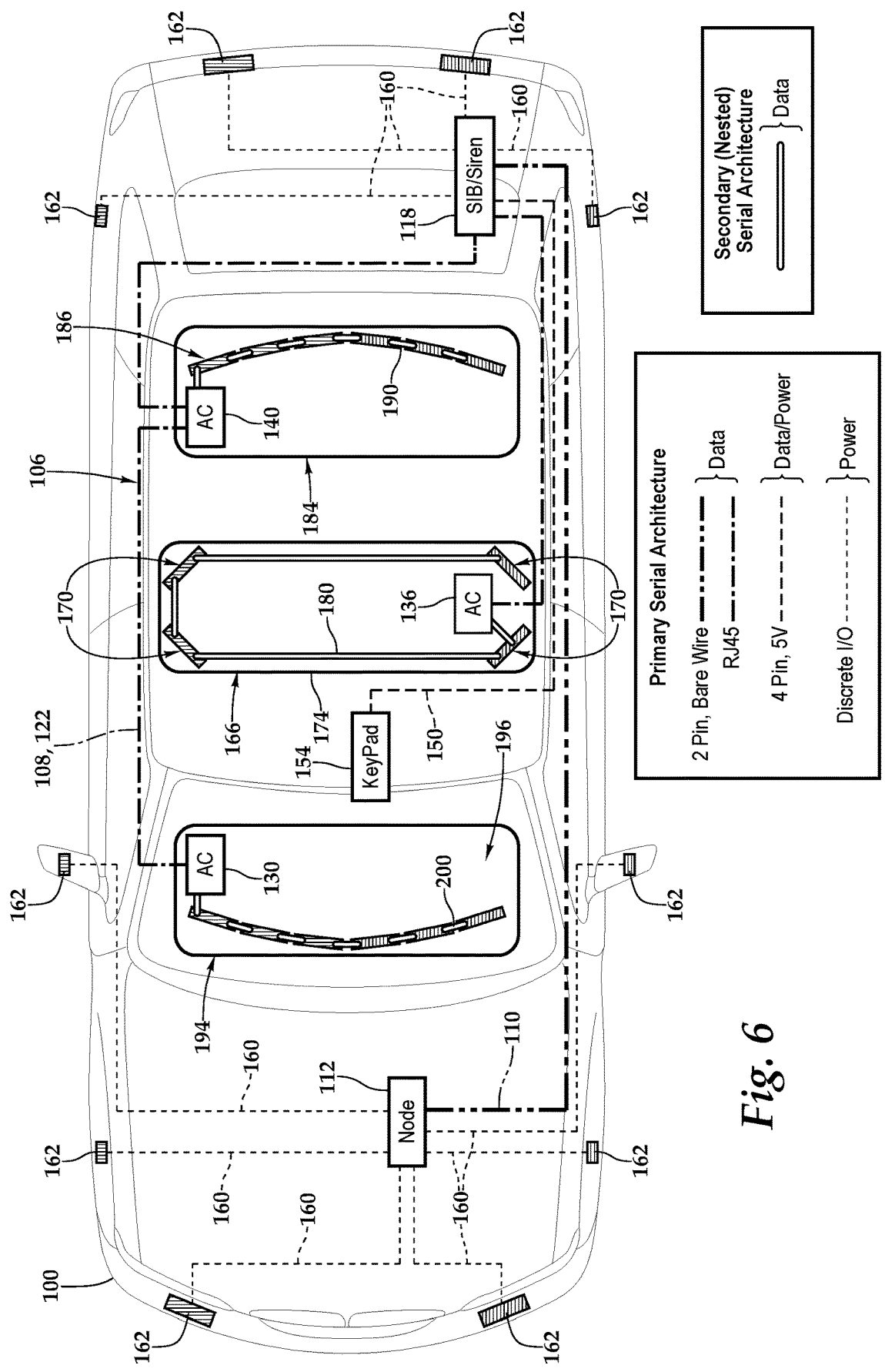
FIG. 6 is a top plan outline view of an emergency vehicle on which is superimposed a block diagram showing external and internal serial bus architectures of light modules and other nodes deployed throughout the emergency vehicle.

FIG. 6 shows an overhead view of an outline of an emergency vehicle 100 having an embedded serial network 106 of external warning systems and associated controllers including distributed nodes and light heads arranged about the perimeter of vehicle 100. Embedded serial network 106 is also referred to as ECCONet because it is developed by Electronic Controls Company (ECCO) of Boise, Id., the assignee of this patent application, in cooperation with its affiliate company Code 3, Inc. of St. Louis, Mo. ECCONet includes a primary CAN serial data bus 108 implementation of the fault tolerant, lower-speed ISO 11898-3 specifications. For conciseness, primary CAN serial data bus 108 is referred to as bus 108 or ECCONet.

A CAN node typically includes a CAN controller and a CAN transceiver. The CAN controller includes, for example, embedded logic implementing the CAN protocol. The CAN transceiver provides a circuitry interface to the physical CAN bus. These two components are frequently packaged together in a common IC platform, such as in a microcontroller. Accordingly, skilled persons will appreciate that a complete CAN solution may be referred to generally as CAN node circuitry or simply as a CAN controller.

The underlying physical wiring employed in ECCONet includes a variety of wiring options such as, for example, two-pin data wires 110 between a signal distribution node 112 and a serial-interface board (SIB) 118; a data cable 122 (see also, FIG. 8) connection between SIB 118 and three array controllers (ACs) 130, 136, 140 having 8 position, 8 contact (8P8C) plug connectors 146 (FIG. 8) commonly referred to as RJ45 modular connectors in the context of Ethernet-type cables; a four-pin, five volt (V) data and power line 150 between a keypad node 154 for selecting illumination settings (e.g., dim level, flash pattern, and other settings) and SIB 118; and discrete I/O (e.g., power on-off cycling) cables 160 to non-serially connected light heads 162 actuated by signal distribution node 112.

SIB 118 is a dedicated controller node having a personal computer (PC) interface that, as explained later with reference to FIG. 9, enables an end user to readily reconfigure their system. SIB 118 also includes dedicated memory space by which to maintain network-level status logs. SIB 118 communicatively couples several different ECCONet nodes that employ the aforementioned different cable connections while also providing optional auxiliary features, such as an interface for discrete I/O or a siren.

In another embodiment, ECCONet operates without a SIB, at the discretion of the end user weighing cost, complexity, and desired functionality. For example, in principle, any combination of two or more ECCONet nodes could form an autonomous system. This is so because priority functions and system synchronization are accomplished via the CAN message structure of the bus itself. CAN differs from other common embedded networks in that it operates with a multi-master structure. There is no host controller per se, such as in a Universal Serial Bus (USB), and no master-slave relationship per se, such as in a Serial Peripheral Interface (SPI) bus.

Any CAN nodes communicatively coupled through bus 108 may be provided by a different original equipment manufacturer (OEM). And the complexity of a CAN node can range from a simple I/O device to a complex embedded computer having an integrated CAN controller and relatively sophisticated software. A node may also be a gateway allowing a standard computer (see e.g., FIG. 9) to communicate over a USB or Ethernet port to the devices on a CAN network. Accordingly, bus 108 facilitates interoperability between products independently developed by OEMs and partners.

A rooftop array 166 of light heads 170 (i.e., multiple light engines in a light bar 174) appears to other nodes on bus 108 as a unitary CAN node that receives and transmits serial data through bus 108. Rather than convert that data to discrete I/O (e.g., power cycling) for each light head 170, each light head 170 within light bar 174 is itself a node on a secondary (nested) CAN serial data bus 180 maintained in serial communication by array controller 136 of light bar 174.

Vehicle 100 and bus 108 also accommodate other types of arrays in lieu of or in addition to rooftop array 166. FIG. 6 shows several such arrays, although in practice most emergency vehicles will either have one rooftop array, front- and rear-facing arrays (e.g., for so-called slick-top vehicles), or some combination of rooftop and front- and rear-facing arrays. For instance, a rear-facing rooftop external array 184 (known as a Safety Director™ configuration) includes array controller 140 and multiple light heads 186 communicatively coupled to another nested CAN bus 190. A lower front windshield interior array 194 includes array controller 130 and multiple light heads 196 communicatively coupled to another nested CAN bus 200. Additional slick-top embodiments (not shown) of arrays having a nested CAN bus available from Code 3, Inc. include an upper front windshield interior array arranged according to a SuperVisor® configuration; a lower rear window interior array arranged according to a WingMan™ configuration; and an upper rear window exterior array mountable to a fiberglass visor, which is also called roof spoiler arranged according to a Citadel™ configuration for sport-utility vehicles. In other embodiments (also not shown), a single array controller maintains multiple spaced-apart arrays.

Figure 1:
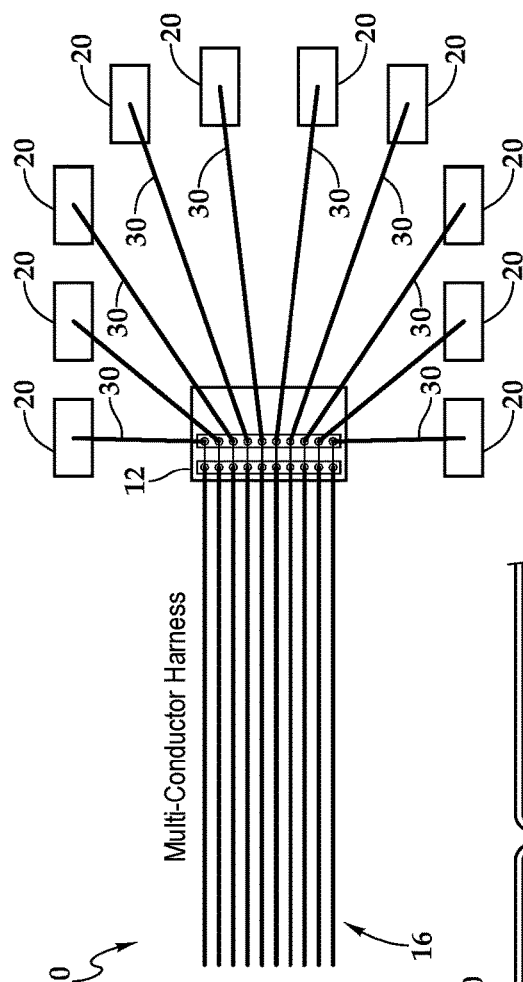
FIG. 1 is a block diagram of an array of light heads and a simplified wiring harness through which each light head receives illumination-control signals from a discrete color-coded wire combination made at the wiring harness, according to the prior art.
Figure 2:
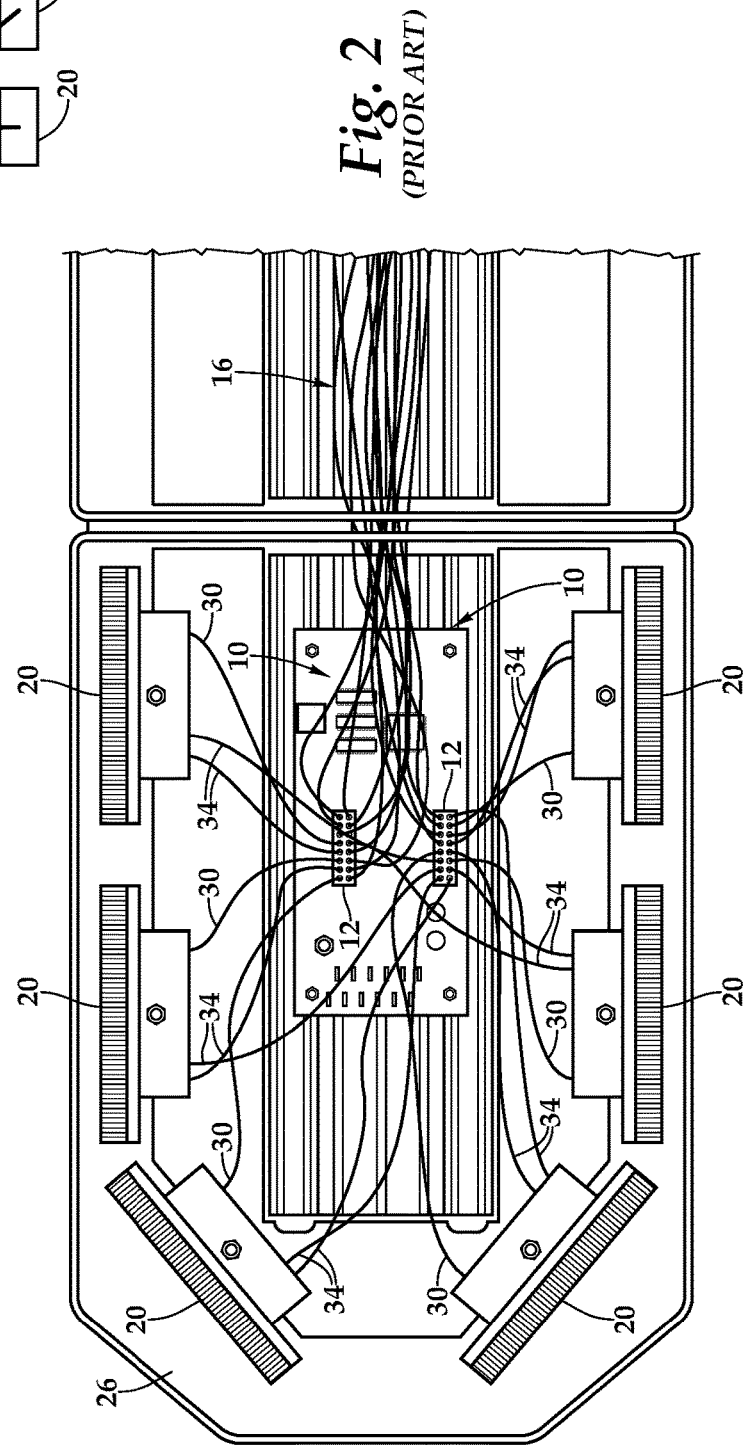
FIG. 2 is a top plan pictorial view of a light bar employing the prior art wiring technique shown in FIG. 1.
Figure 3:
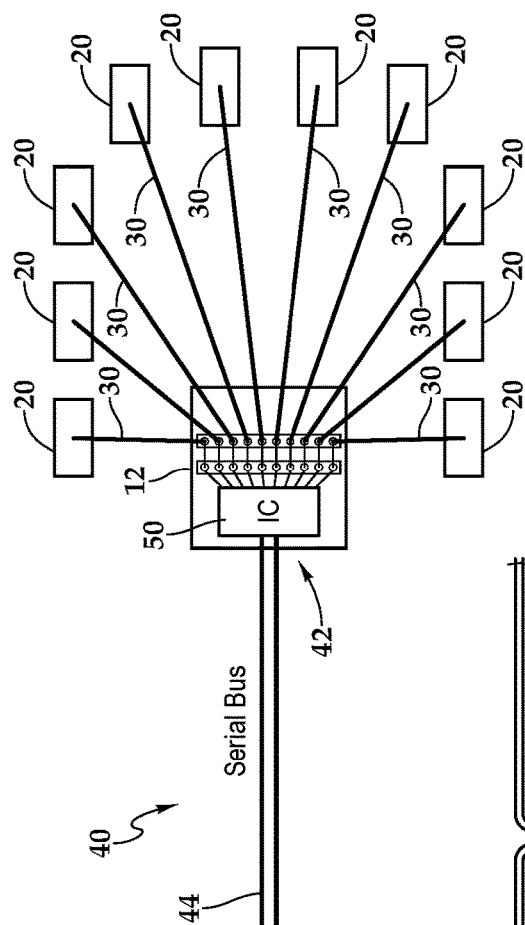
FIG. 3 is a block diagram of an array of light heads and a serial-to-discrete input-output (I/O) controller through which each light head receives illumination-control signals from a discrete output of the controller, according to the prior art.
Figure 4:
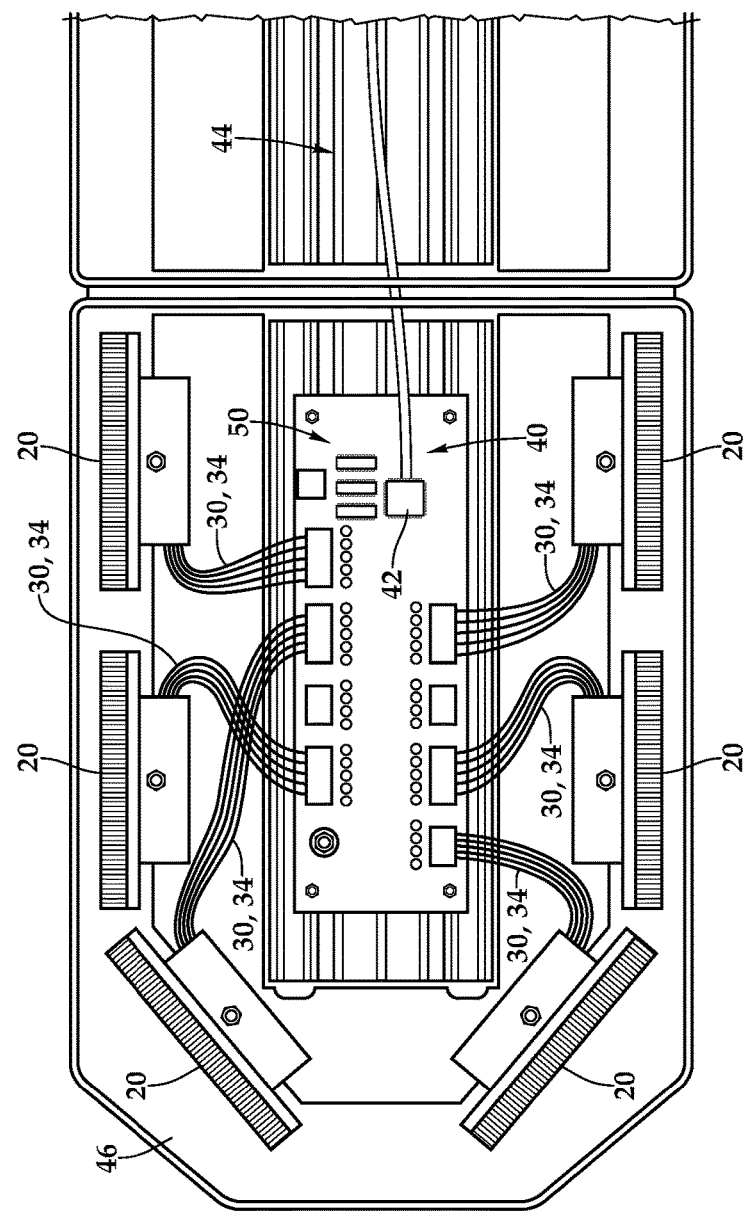
FIG. 4 is a top plan pictorial view of a light bar employing the prior art wiring technique shown in FIG. 3.
Figure 5:
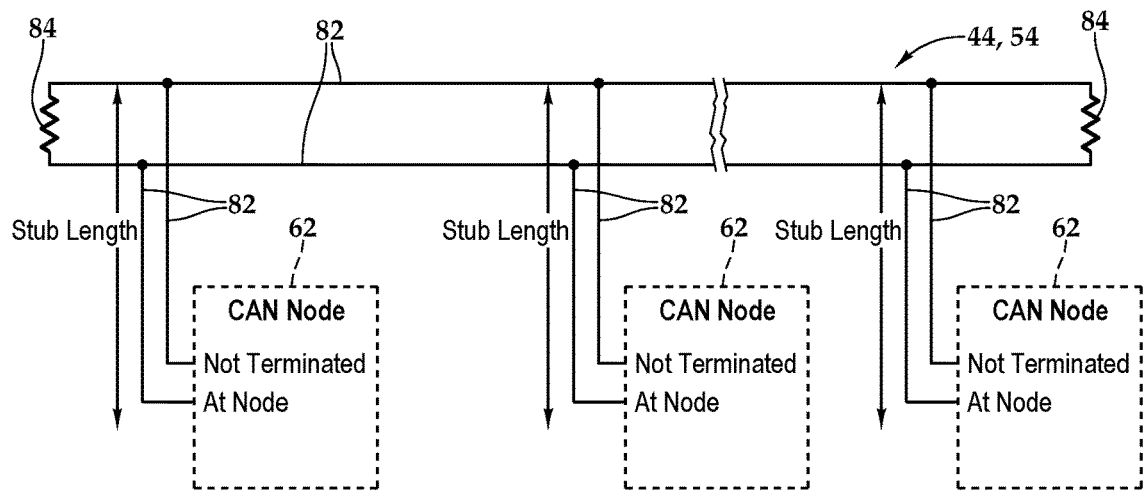
FIG. 5 is a block diagram of a prior art high-speed ISO 11898-2 serial network.

The maximum baud rate of a low speed CAN bus is 125 kilobit per second (symbol kbit/s or kb/s, often abbreviated "kbps"), which is the standard rate for ECCONet nodes. In another embodiment, cable 122 and associated connectors 146 implement a robust line topology, per ISO 11898-2, which is less subject to electromagnetic interference (EMI) and supports communication speeds up to one megabit per second (Mbit/s or Mb/s, often abbreviated "Mbps"). According to other embodiments, systems including SIB 118 will conform to the line topology of a high speed CAN bus of FIG. 5, irrespective of the communication baud rate. Thus, in some embodiments, ECCONet includes a higher-speed ISO 11898-2 CAN bus.

Figure 7:
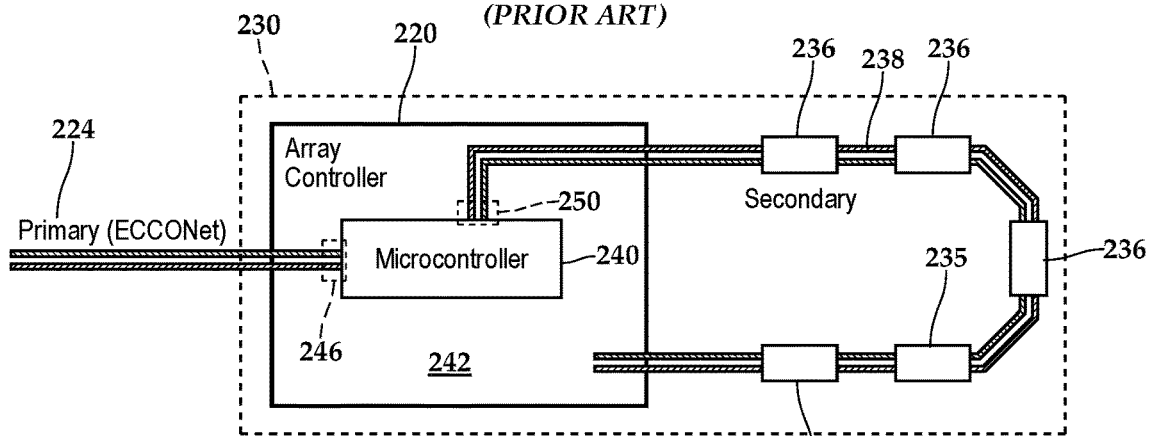
FIG. 7 is a block diagram of an improved light bar serial architecture, according to one embodiment.

FIG. 7 illustrates in greater detail an array controller 220 and its relationship between an ECCONet 224 outside an array 230 and individual light modules 236 arranged to form array 230 and communicatively coupled to a nested bus 238. A microcontroller 240 on a main printed circuit board (PCB) 242 has two independent CAN controllers operating simultaneously. For example, a first controller 246 receives a CAN message through ECCONet 224 to notify array controller 220 when a selected flash pattern is requested by another CAN node (e.g., keypad 154, FIG. 6). In response, microcontroller 240 processes the message and translates it into a form suitable for a second controller 250 to relay the flash pattern information to individual light modules 236. For example, when array controller 220 receives an instruction to initiate the flash pattern as a sequence of light emitted by different ones of light modules 236, it maintains the flash pattern sequence timing by generating a series of synchronized messages communicated through second controller 250 over bus 238. During an active pattern of flashes, a dim level may be updated on the fly at any time by separate messages delivered to light modules 236.

According to one embodiment, the synchronized messages are broadcast messages addressed to every CAN-identifier present on bus 238. This is made possible by, for example, each light module 236 having internal flash pattern instructions that indicate whether the associated light module should flash or skip a particular broadcast message in the sequence. According to another embodiment, the synchronized messages are addressed to individual or subsets of CAN-identifiers. And in yet another embodiment, broadcast messages include data fields having instructions, such as a bitmask, that encode whether a given light module should flash once the instructions are processed by a light head microcontroller.

According to one embodiment, microcontroller 240 is a member of the Programmable System-on-Chip (PSoC®) 4200-L product family of programmable embedded system controllers available from Cypress Semiconductor Corporation of San Jose, Calif. The PSoC® 4200-L product family is based on a scalable and reconfigurable platform architecture including an ARM® Cortex®-M0 central processing unit (CPU). The product family is characterized by its combination of microcontroller with digital programmable logic, and including programmable analog, programmable interconnect, secure expansion of memory off-chip, analog-to-digital converters (ADCs), operational amplifiers with a comparator mode, and standard communication and timing peripherals. For facilitating serial communications, microcontroller 240 includes four independent run-time reconfigurable serial communication blocks (SCBs) with reconfigurable I²C, SPI, or universal asynchronous receiver/transmitter (UART) functionality; USB Full-Speed device interface at 12 Mbps with Battery Charger Detect capability; and two internal CAN 2.0B node circuitry components, each of which includes independently controllable CAN controllers (i.e., controller 246 and controller 250) for industrial and automotive networking. Accordingly, microcontroller 240 acts as a bridge between the primary and secondary buses. Because the two buses are segregated, they afford no direct CAN communication between nodes present on the buses. Thus, the bridge, implemented through internal logic of the microcontroller, provides a path by which to translate CAN communications from nodes of one bus to those the other. It also facilitates firmware updates or configuration changes initiated from the ECCONet side, as explained later with reference to FIG. 9.

Each light head 236 also includes controller circuitry for establishing a node on bus 238. For example, according to one embodiment, each light head 236 includes an ATmega16M1 automotive 8-bit AVR® microcontroller available from Atmel Corporation of San Jose, Calif. This type of microcontroller includes, among other things, 16 kilobytes of in-system memory; internal CAN node circuitry (e.g., a CAN 2.0A/B controller); a 10-bit ADC having up to 11 single ended channels; and an on-chip temperature sensor for communicating temperature information through a secondary CAN serial data bus 238 to array controller 220, which reports this diagnostic information through bus 224 to other nodes (e.g., keypad 154 or SIB 118, FIG. 6) facilitating audible or visual presentation of an over-temperature condition occurring at an individual light head.

Figure 8:
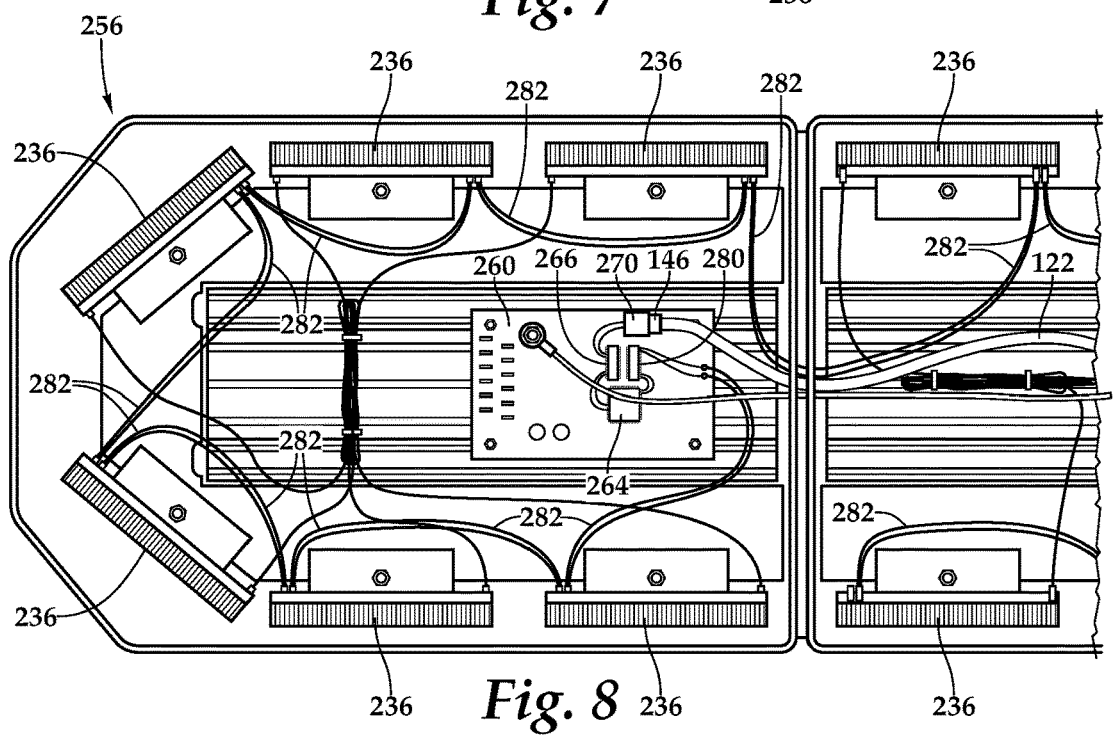
FIG. 8 is a top plan pictorial view of a light bar employing the architecture of FIG. 7.

FIG. 8 shows a fully integrated embodiment of a serial light bar 256 having a streamlined and simplified internal wiring configuration that readily scales irrespective of the number of light heads or colors available on each light module. Wiring orientation also becomes irrelevant, so long as all heads are connected in a serial chain. There are no wire colors or harnesses to match up with specific light locations.

Serial light bar 256 includes an array controller 260 that is functionally similar to array controller 220 of FIG. 7. Structurally, however, array controller 260 includes a microcontroller 264 having two external CAN controllers. A first CAN controller 266 is electrically coupled to an RJ45 connector 270, which receives plug connector 146 so as to communicatively couple first CAN controller 266 to ECCONet 108 (FIG. 6) through cable 122. A second CAN controller 280 is electrically coupled to serial data cabling (wires) 282 connecting light heads 236. Thus, light bar 256 houses serial data cabling 282 establishing secondary CAN serial data bus 238 (FIG. 7).

In another embodiment (not shown), an array controller includes a pair of microcontrollers in which a first microcontroller is coupled to an ECCONet and a second microcontroller is coupled to a nested CAN bus. Each microcontroller, therefore, is coupled to a separate internal or external CAN controller, and the pair of microcontrollers exchange short SPI communications through an SPI bus or other communications interface bridging the two buses.

Figure 9:
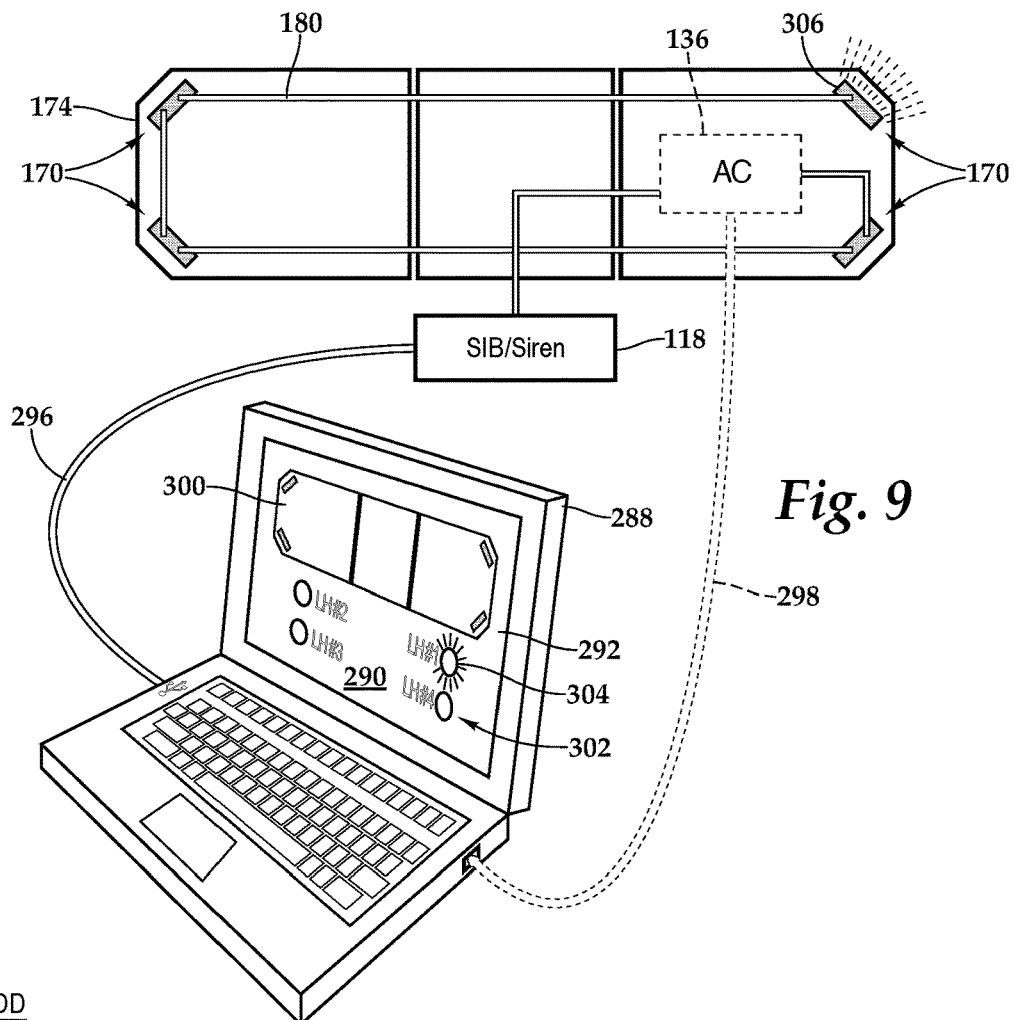
FIG. 9 is a block diagram of a configuration utility for configuring a light bar employing the architecture of FIGS. 6-8.

FIG. 9 shows a computer device 288 in communication with light bar 174. Computer device 288—which may be a laptop, portable smart device (e.g., tablet), or any other programmable electronic user equipment device—includes a display panel 290 that presents to a user a GUI 292 representing light bar 174. FIG. 9 also shows two arrangements for connecting the configuration tools to an array. According to a first embodiment, computer device 288 connects to SIB 118 (or other ECCONet node) through a USB data bus 296 (or CAN or other serial interface). According to a second embodiment, computer device 288 connects directly to array controller 136 through a serial connection 298. Skilled persons will also appreciate that wireless connectivity (e.g., Bluetooth® personal area networking) may be used between computer device 288 and CAN nodes, in some embodiments.

With reference to GUI 292, computer device 288 facilitates automatic or user-initiated testing and configuration of light head capabilities on the internal, nested CAN bus. The testing and configuration may check or facilitate any of the following capabilities: temperature sensing, dimming features, color verification, spatial arrangement confirmation, identification of failed heads, calculation of max instantaneous current draw for an entire array (e.g., while testing under the most power-intensive flash patterns), and development of desired flash patterns. For example, a user initially selects from GUI 292 a light bar model matching that of light bar 174. In response to the selection, GUI 292 presents a representation 300 of the selected model, which in the present example includes four light head position numbers 302 mapped to predefined position-based CAN-identifiers defining corresponding deployment locations in light bar 174. Specifically, the first and second position numbers correspond to, respectively, front starboard and port corner locations. And the third and fourth position numbers correspond to, respectively, rear port and starboard corner locations. Thus, these position numbers have corresponding digital values that are included in a CAN-identifier field identifying CAN messages as being addressed to particular light heads placed in the corresponding physical corner locations. Initially, however, each light head 170 establishes its own randomly assigned CAN-identifier that is communicated to computer device 288 (e.g., communicated via array controller 136 during an initialization sequence). The random identifier is eventually changed to, or otherwise supplemented with, a proper positioned-based CAN-identifier once a light head has been positively identified and its position within the light bar verified through use of GUI 292.

As part of a verification process, computer device 288 determines whether the total number of random identifiers matches the predefined number of light heads for the array. Too few random identifiers means that some light heads are sharing identical identifier number, in which case computer device 288 or array controller 136 causes light heads 170 to reset and obtain new random identifiers. When light heads 170 do eventually obtain unique identifiers, computer device 288 begins addressing them by their random identifiers so as to verify physical locations and assign the proper position identifiers.

To assign a position identifier, a user selects an on-screen button 304, or other user input component selected from GUI 292, that actuates a light head 306. In response, computer device 288 generates a message addressed to the randomly assigned identifier of light head 306. The message is optionally conveyed through intermediate nodes (e.g., SIB 118 and array controller 136) and configuration information is eventually delivered through secondary bus 180 to light head 306. Light head 306 receives and process the configuration information, which in the present example causes light head 306 to temporarily actuate its LED strings. In response to the actuation, light head 306 flashes so that the user can verify its physical installation location in light bar 174 by comparing the location of the flash to that indicated by GUI 292. Once verified, another message may be sent to update the now-confirmed light head 306 (or to update array controller 136) with a corresponding position identifier. The user also confirms light head 306 emits the appropriate colors of light by comparing the emitted colors to those shown by GUI 292.

To facilitate automatic testing of whether an array actually includes the proper light heads, a self-identification (self-ID) process, described below, is performed by light heads on the secondary bus so as to verify that an installed module is the one that possesses the desired specifications for a particular array, e.g., it produces the correct color and has the correct number of LEDs. In other words, the self-ID process ensures the desired configuration of the array and may be performed prior to any other user-initiated testing of light heads present on a secondary bus. Skilled persons will appreciate, however, that light heads present on the primary (ECCONet) bus may also implement the self-ID techniques or other diagnostic capabilities described in this disclosure, according to some embodiments. When implemented on the primary bus, the light heads coupled thereto would provide color information, temperature, and other diagnostic information communicated over the primary bus.

In general, the self-ID process is accomplished by a combination of hardware and software techniques through which each serial light head provides to its array controller, e.g., in response to a request, three eight-bit binary numbers. The three eight-bit binary numbers are each created by an individual light head based on a combination of firmware algorithms and measured voltage values that differentiate one light head family from another and uniquely identify a light head type within the identified family. Once generated by the light head, the three numbers are transmitted by each light module to the array controller, which will then store those numbers and correlate them with specific module types or provide them to a configuration utility that performs the correlation. For example, upon request, the self-ID values are sent, e.g., via array controller 136, to computer device 288 (FIG. 9). These three numbers, referred to as PORT ID, COLOR ID, and MASK, are then compared to a predefined lookup table (or other index) that maps values of the numbers returned from a light head under consideration (i.e., one selected from GUI 292) to a particular light head type in a family of light heads.

A value for a PORT ID is established by a combination of two half bytes: CLASS, which is a hardcoded value, and an ADC channel number, which is dynamically determined based on a number of an ADC channel, e.g. ADC0 318 (FIG. 10), assigned to a first control line (L0) 320 that actuates a middle string of LEDs 326.

With reference to Table 1, the following paragraphs describe an example that assumes a PORT ID of 0001 0000 (binary) for the Torus 3UP/6UP/9UP Take Down (T/D) Alley family of light heads, in which the upper nibble is the CLASS and the lower nibble indicates that ADC0 corresponds to first control line L0 320.

TABLE 1

PORT IDs for Various Families

| ADC# for L0 | CLASS | | | | |
|---|---|---|---|---|---|
| | 0001 | 0010 | 0011 | ... | 1111 |
| 0000 | Torus 3UP/6UP/9UP T/D Alley | TBD | Torus 12UP/18UP Corner | ... | ES6 |
| 0001 | TBD or Error State (ES) 1 | | | | |
| 0010 | Torus 6UP/8UP Corner | Quadcore | TBD | ... | ES7 |
| 0011 | PrizmII 24UP Reflector | TBD | TBD | ... | ES8 |
| 0100 | TBD or ES2 | | | | |
| 0101 | PrizmII 8UP/12UP Reflector; 2700 5UP TD/Alley | TBD | TBD | ... | ES9 |
| 0110 | TBD or ES3 | | | | |
| 0111 | TBD or ES4 | | | | |
| 1000 | Torus 3UP/4UP Directional | TBD | TBD | ... | ES10 |
| 1001 | Torus 16UP | TBD | TBD | ... | ES11 |
| 1010 | TBD or ES5 | | | | |

The CLASS half-byte is hardcoded in firmware based on the light head family. Note that all assembly variants of the same family have the same firmware version and hardware platform. Thus, the assembly variants sharing a common hardware platform also share a common class number for the family. The use of unique classes for different hardware platforms expands the number of serial light head combinations available for design variants. Class number zero (binary number 0000) is declared invalid so as to avoid a valid PORT ID having all eight of its bits equal to zero.

An ADC channel number assigned to a first control line L0 provides the second half-byte of the PORT ID. Various different light head families have different ADC channel numbers assigned to a first control line L0. When actuated, the control lines are capable of providing power to strings of LEDs and the corresponding ADC channel detects a forward voltage drop. To test its ADC channel assigned to first control line L0 320, light head 306 (FIG. 9) pulls first control line L0 320 low, which shuts off a first transistor (Q5) 330 and thereby actuates a second power MOSFET transistor (Q2) 336 serially connected to string of LEDs 326. This activates three white LEDs 340 at a relatively low current of approximately 100-200 milliamps (mA). Based on its hardcoded ADC channel number, i.e., the family's designated ADC channel, light head 306 will then read a voltage value applied to ADC0 318 to confirm this ADC channel number registers a valid voltage reading. Note that the ADC channels detect a voltage drop (via resistive divider) across an LED at the MOSFET source terminal because a low-side LED measurement protects a microcontroller analog port from overvoltage situations that could otherwise arise if measuring a high-side LED while the MOSFET drain terminal is non-conducting and pulled to a high rail-voltage.

A valid measured voltage value is expected to be between about 0.5 V and about 1.33 V when a string of LEDs is forward biased. Voltages outside this range indicate one of several possible errors: the wrong firmware (having the incorrect ADC-to-L0 mapping) was flashed into memory on the light head; a light string is damaged; or the string of LEDs was incorrectly installed on the bare PCB. An error in the voltage is reported through one of the PORT ID Error State (ES) shown in Table 1.

When a proper voltage in the 0.5-1.33 V range is measured, light head 306 updates the corresponding half-byte of its PORT ID to communicate that ADC0 318 corresponds to first control line L0 320. For example, assuming ADC0 318 is associated with first control line L0 320, and a valid voltage range is returned for that channel number, then light head 306 will insert the value of zero (0000, in binary) into the corresponding half-byte location of its eight-bit PORT ID. In another example, assuming ADC5 344 is associated with first control line L0 320, the light head will insert the number five (0101, in binary) into the corresponding half-byte location of the eight-bit PORT ID. The information of Table 1 (or a portion thereof) is available at computer device 288 or array controller 136, which resolves the light head family based on the received PORT ID value. If the light head family does not match the family that is desired for array 170, or any other installation error is detected, then an error notification or visual alert is provided to a user of GUI 292.

Some LED configurations (e.g., a six-string red/blue configuration) are appropriate for emergency vehicles whereas other configurations are appropriate for service vehicles (e.g., a two-string amber/white configuration). But the same unpopulated (bare) PCB may support these different strings of LEDs that are not reported via the PORT ID. Therefore, to dynamically differentiate LED configurations within a family, the value of the COLOR ID represents all valid raw ADC values observed for a light head, since these values—in cooperation with the MASK explained later—differentiate the LED configuration. For example, each unpopulated (bare) PCB has certain members of a predetermined set of ADC channel numbers that are electrically connected to LEDs that activate in response to corresponding control lines. Accordingly, each light head checks members of its predetermined set of ADC channels (e.g., members indicated in firmware) upon activating the control lines.

particular type of light head among the family's hardware platform.

To measure the voltages, a light head activates one of the control lines, polls each of its designated ADC inputs one at a time, detects input voltages, updates the COLOR ID as explained below, tests the next control line, and so forth. Some light heads may use up to six control lines and up to eight ADC inputs (e.g. a control line actuates multiple strings but ADC inputs check strings individually), but the firmware optionally establishes that only specific inputs are to be checked. As shown in Table 2, for each ADC channel detecting a relatively high voltage between about 0.8 V and about 1.33 V, the light head will insert a binary '1' in the corresponding COLOR ID bit location. It will insert a binary '0' in the corresponding COLOR ID bit location if the raw ADC voltage is any other value, either above or below the high-voltage range. ADC inputs that are not checked on a particular head, i.e. those for which the light head does not use, are also assigned a binary '0' in the corresponding COLOR ID bit location.

TABLE 2

| COLOR ID, 9UP red/white/red (Torus 3UP/6UP/9UP family) COLOR ID: 0000 0001 | | | | | | | |
|---|---|---|---|---|---|---|---|
| ADC9 | ADC8 | ADC7 | ADC6 | ADC5 | ADC3 | ADC2 | ADC0 |
| 0 | 0 | 0 | 0 | 0 | 0 | 0 | 1 |

Figure 10:
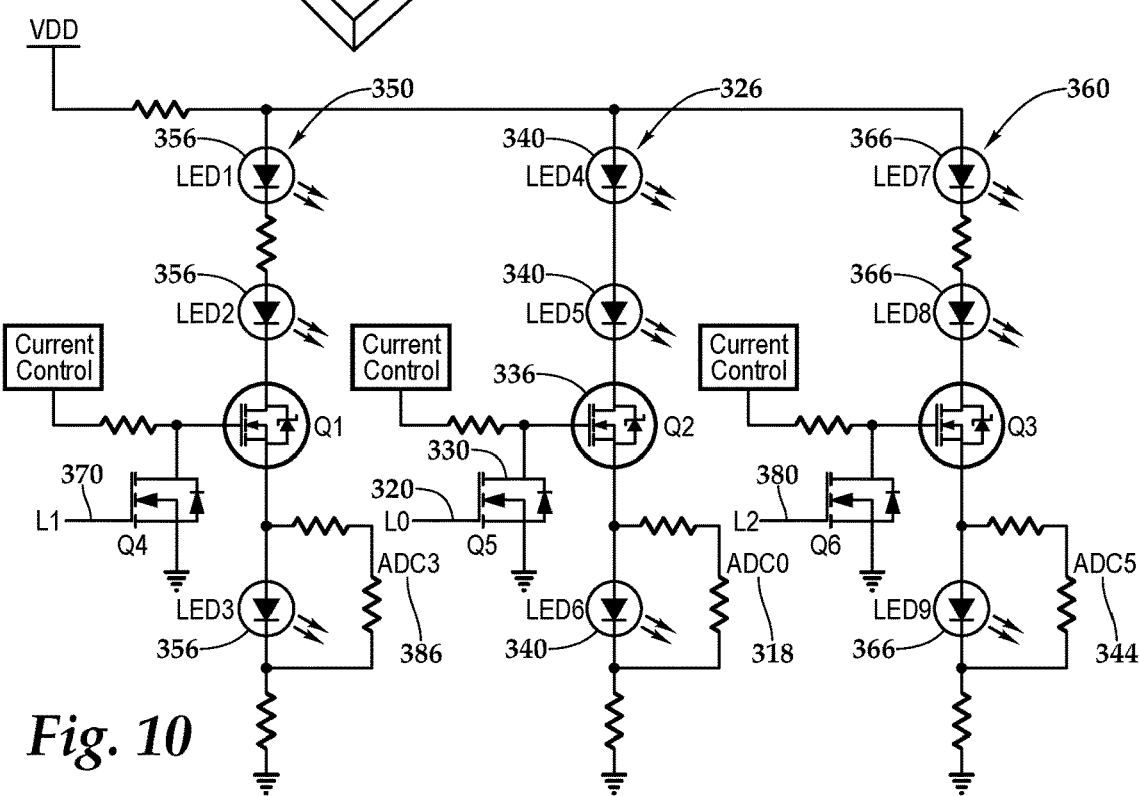
FIG. 10 is an electrical circuit diagram of circuitry used in performing a self-identification process in connection with automatic verification testing or manual testing controlled by a graphical user interface (GUI) of the configuration utility of FIG. 9.

The measured voltage drops across strings of LEDs vary among different types of light heads in the family. For instance, FIG. 10 shows that a 9UP light head of the Torus 3UP/6UP/9UP family includes (white) string 326 of three white LEDs 340, a first red string 350 of three red LEDs 356, and a second red string 360 of three red LEDs 366. The three strings 326, 350, and 360 activate in response to signals applied to, respectively, control lines L0 320, L1 370, and L2 380. In this example, ADC0 318, which corresponds to first control line L0 320, detects a relatively high voltage across white LEDs 340. And ADC3 386 and ADC5 344 detect relatively low voltage drops because red LEDs 356 and 366 have a different forward voltage drop than that of white LEDs 340. Thus, the COLOR ID of Table 2 shows a high voltage drop is encoded as a '1' in the LSB location representing ADC0 318 and the low voltage drops are encoded as '0' in each of the third and fourth bit locations representing, respectively, ADC3 386 and ADC5 344.

In another example, a 9UP member of the family has red, white, and amber strings that activate in response signals on, respectively, control lines L1, L0 and L2. The COLOR ID for this example is shown in Table 3. A middle string of white LEDs on L0 are encoded as '1' for ADC0; an upper string of red LEDs on L1 are encoded as '0' for ADC3; and a lower string of amber LEDs on L2 are encoded as '1' for ADC5.

TABLE 3

| COLOR ID, 9UP red/white/amber (Torus 3UP/6UP/9UP family) COLOR ID: 0000 1001 | | | | | | | |
|---|---|---|---|---|---|---|---|
| ADC9 | ADC8 | ADC7 | ADC6 | ADC5 | ADC3 | ADC2 | ADC0 |
| 0 | 0 | 0 | 0 | 1 | 0 | 0 | 1 |

The members showing valid voltages indicate the LED configuration of a light head, which in turn identifies a In yet another example, an 8UP member of a different family has two amber strings that activate in response signals on, respectively, control lines L0 and L1. Unlike in the previous examples, however, these control lines correspond to, respectively, ADC8 and ADC9. Other combinations are possible as well.

If raw ADC values are found to be outside an expected range, such as voltages greater than 1.33 V, then this error is communicated in the PORT ID, not the COLOR ID. (Note in Table 1 the dedicated CLASS and ADC combinations that act as placeholders for various error states.) Table 4 shows several ranges and their associated status conditions.

TABLE 4

Example Raw ADC Ranges and Associated Status

| Sampled Raw* ADC value (V) | Status |
|---|---|
| about 0 | String populated but not active, or open circuit. |
| 0.2-0.45 | String damaged, unknown error. |
| 0.5-1.33 | String populated, active. In some embodiments, lower voltage (0.5-0.8 V) corresponds to red LEDs and some types of amber LEDs (R/A); higher voltage (0.81-1.33 V) corresponds to blue, green, white (B/G/W) and other types of amber LEDs. |
| >1.33 | String shorted. |

*Raw ADC value is about one third of the actual value of the voltage.

The MASK has six bits (called ID bits) established by external pull-down resistors, or other techniques, that provide digital voltage ranges sampled by digital I/O inputs of a light head microcontroller. Accordingly, a microcontroller samples voltages at defined I/O pins to determine the value of the six corresponding bits. A high digital logic level is encoded as a binary '1,' and vice versa. The two most significant bits of the MASK are reserved for future use. A high bit is established by an unplaced (void) resistor on a bare PCB.

ID0 and ID1 identify a single-, double-, or tri-color head. For example, a tri-color head has '11' for ID0 and ID1. ID2-ID5 represent additional bits that further distinguish different types of light heads among a family.

Once the PORT ID indicates a family, a table or other data structure for the particular family maps the MASK and COLOR ID to a particular light head and LED configuration within the family. For example, upon request, a light head will transmit its PORT ID, COLOR ID, and MASK to, e.g., computer device 288. Computer device 288 contains its own version of a PORT ID table to identify the light head family (bare PCB type). Once computer device 288 has identified the light head family (bare PCB type), it then uses the COLOR ID and MASK to pinpoint the light head type from a table (or other data structure), such as the example shown in Table 5.

TABLE 5

MASK and COLOR ID, Individualized Light Head LED Configuration Matrix (Torus 3UP/6UP/9UP family)

| MASK | | COLOR ID | |
|---|---|---|---|
| ID0-ID1 | ID2-ID5 | ADC5, ADC3, ADC0: 1 = Raw ADC between 0.5-1.33 V 0 = Raw ADC between 0.2-0.45 V X = Raw ADC between 0.0-0.2 V Y = Raw ADC (Do Not Care) | |
| | | Y, Y, 1   0, Y, 1   . . .   1, 0, 1 | |

TABLE 5-continued

MASK and COLOR ID, Individualized Light Head LED Configuration Matrix (Torus 3UP/6UP/9UP family)

| MASK | | COLOR ID | |
|---|---|---|---|
| 01 (single) | 1111 | 3UP white | |
| 10 (double) | 1111 | . . . | . . . |
| 11 (triple) | 1111 | . . . 9UP red/white/ red (Table 2) | 9UP red/white/ amber (Table 3) |

Note that there are many more combinations of colors and strings than are likely to be used in any light head family (bare PCB). GUI 292 may store and present a subset of known or desired combinations, rather than a very large table including placeholders for all possible combinations.

Skilled persons will appreciate that many changes may be made to the details of the above-described embodiments without departing from the underlying principles of the invention. For example, although a light bar is itself a specific product, the design features described herein are modular concepts. They can be implemented independently within any other product as needed. The scope of the present invention should, therefore, be determined only by the following claims.

The invention claimed is:

1. An array of multiple light heads for a vehicle having a primary Controller Area Network (CAN) serial data bus to carry first serial communications among spaced-apart CAN nodes communicatively coupled thereto, the first serial communications for initiating a light flash sequence from the array, comprising:
   a secondary CAN serial data bus for establishing a nested CAN serial data bus carrying, in response to the first serial communications, second serial communications provided to the multiple light heads communicatively coupled thereto, the second serial communications for controlling the light flash sequence from the array;
   each of the multiple light heads including light head CAN node circuitry, the light head CAN node circuitry including a light head CAN controller electrically coupled to the secondary CAN serial data bus such that an impedance of the light head CAN node circuitry is electrically isolated from the primary CAN serial data bus when an associated light head is operatively deployed in the vehicle; and
   an array controller including first and second CAN node circuitry configured to communicatively segregate and bridge the primary and secondary CAN serial data buses, the first CAN node circuitry including a first CAN controller electrically couplable to the primary CAN serial data bus so as to establish a first CAN node for facilitating the first serial communications, and the second CAN node circuitry including a second CAN controller electrically coupled to the secondary CAN serial data bus so as to establish a second CAN node for facilitating the second serial communications.

2. The array of claim 1, in which the array comprises a light bar mountable atop a roof of the vehicle.

3. The array of claim 2, in which the secondary CAN serial data bus includes serial data cabling connecting the multiple light heads, and in which the light bar houses the serial data cabling of the secondary CAN serial data bus.

4. The array of claim 1, in which the array comprises a safety director mountable atop of the vehicle and arranged to provide a rearward-facing flash pattern.

5. The array of claim 1, in which the array is mountable to a rear visor of the vehicle.

6. The array of claim 1, in which the array is a rear-windshield mountable array arranged to provide a rearward-facing flash pattern.

7. The array of claim 1, in which the array is a front-windshield mountable array arranged proximal a visor to provide a frontward-facing flash pattern.

8. The array of claim 1, further comprising:
a computer-readable medium including instructions stored thereon that, when executed by a microcontroller of the array controller, configure the array controller to:
in response to receiving a first serial command through the primary CAN serial data bus, process the first serial command to determine a sequence of second serial commands for the multiple light heads; and
in response to determining the sequence of second serial commands, generate the second serial communications according to the sequence so as to control the light flash sequence based on the first serial command.

9. The array of claim 1, further comprising multiple temperature sensors in which each of the multiple light heads includes a different one of the multiple temperature sensors for communicating temperature information through the secondary CAN serial data bus.

10. The array of claim 1, in which each of the multiple light heads includes multiple analog-to-digital converter (ADC) channels electrically coupled to corresponding strings of light-emitting diodes (LEDs), the ADC channels configured to measure voltages associated with the corresponding strings of LEDs such that an associated light head is configured to communicate, through the secondary CAN serial data bus, a digital representation of the measured voltages, the digital representation corresponding to a predefined hardware platform of the associated light head.

11. The array of claim 1, in which the array controller comprises a microcontroller integrated circuit encompassing the first and second CAN node circuitry.

12. The array of claim 1, in which the array controller comprises first and second microcontrollers communicatively coupled to each other, the first microcontroller including the first CAN node circuitry, and the second microcontroller including the second CAN node circuitry.

* * * * *